Nov. 24, 1959     F. J. KENT     2,914,170
EXTRUSION HANDLING DEVICE
Filed April 5, 1954     3 Sheets-Sheet 1
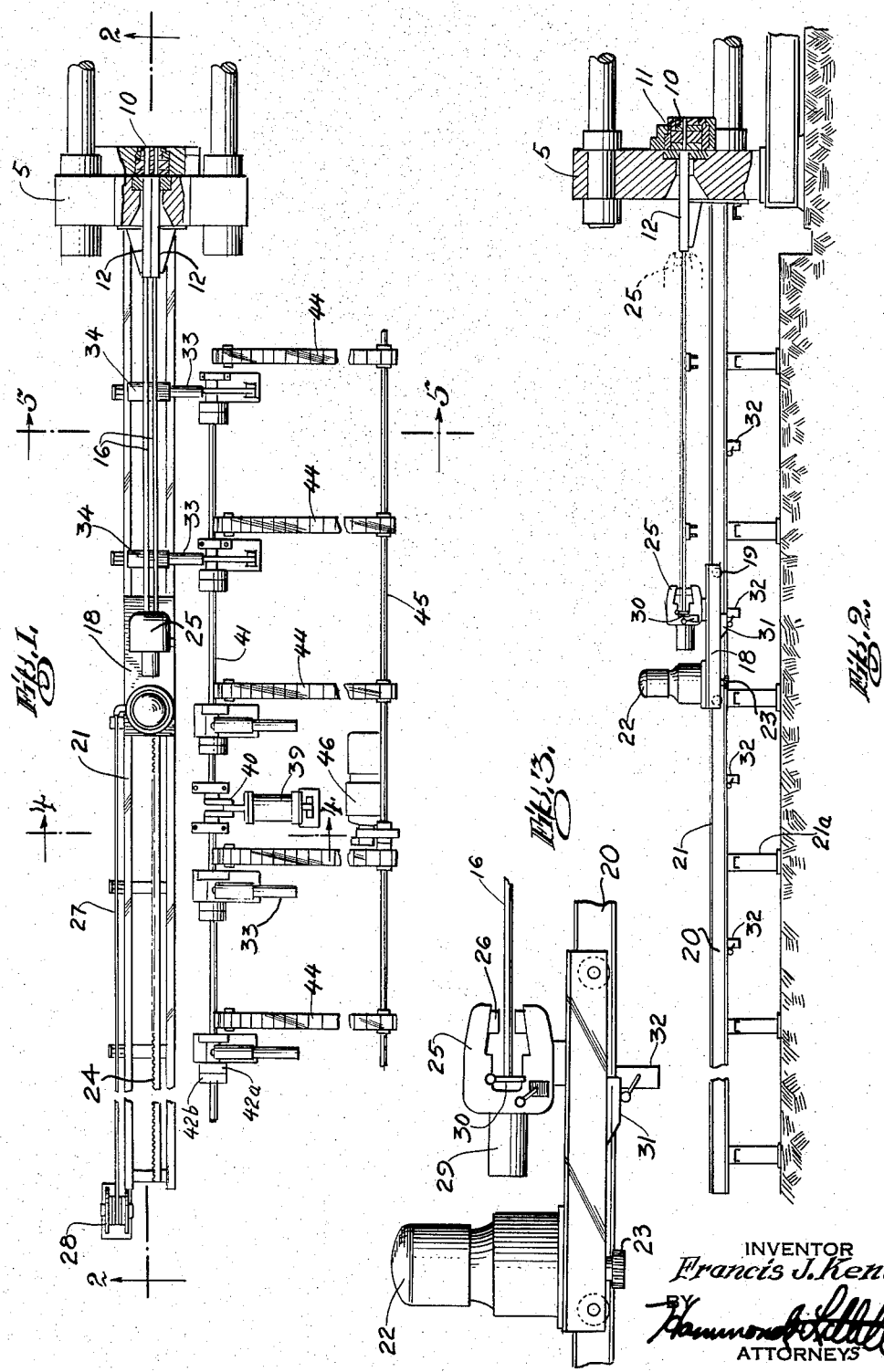
INVENTOR
*Francis J. Kent*
BY
ATTORNEYS INVENTOR
Francis J. Kent
BY
ATTORNEYS

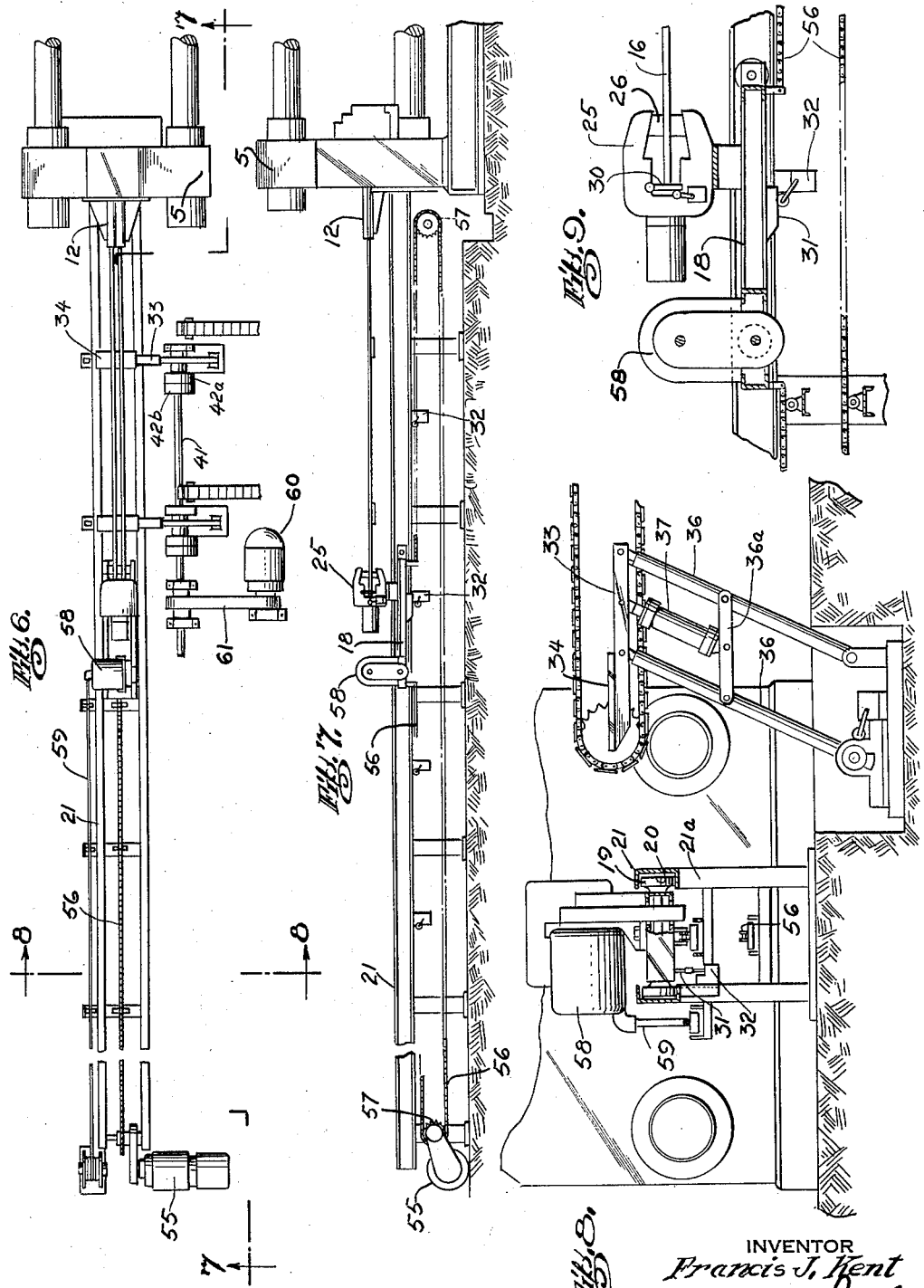

United States Patent Office 2,914,170
Patented Nov. 24, 1959

2,914,170

EXTRUSION HANDLING DEVICE

Francis J. Kent, Forest Hills, N.Y.

Application April 5, 1954, Serial No. 420,783

4 Claims. (Cl. 207—1)

This invention relates to an extrusion handling device particularly for extruded metal shapes produced by an extrusion press.

Extruded material such as heated metal leaving the die of a metal extrusion press is in most cases moved along the run-out table of the extrusion press manually by one or more workmen or in the case of heavy rods and sections, the extruded portion which rests on the run-out table may be pushed forward solely by succeeding material leaving the extrusion die. The extruded parts are then normally moved from the run-out table to a cooling table.

Due to various causes, including the handling of the extruded part on the run-out table, the extruded parts are usually warped and bent or twisted so as to require a stretching and straightening operation. Various attempts have been made to provide mechanical handling equipment for handling extruded metal shapes as they move from the die of an extrusion press, but the prior apparatus suggested for this purpose have not been satisfactory.

It is an object of my invention to provide an extrusion handling device which reduces the manpower requirements in an extrusion operation and also assists in keeping the extruded material substantially straight by advancing it evenly over the run-out table so that subsequent stretching and de-twisting operations will be simplified or, preferably, eliminated.

Another object of my invention is to provide an extrusion handling device capable of receiving several strands of extruded metal or other material at the same time, in case the extrusion press is used for multiple extrusions, and of advancing these several strands of extruded material uniformly from the die along the run-out table, and maintaining the strands of extruded material under substantially uniform tension.

Another object of my invention is to provide an extrusion handling device, particularly for metal extrusion presses, in which the extruded parts are separately handled so as to avoid scratches or other surface damage to the material, and whereby in multi-hole extrusion the individual strands of the extrusion are prevented from contacting each other.

Another object of my invention is to provide an extrusion handling device for metal extrusion presses in which the pulling force on the extruded part may be adjusted in accordance with the size and strength of the part and in which the speed at which the extruded part is moved along the run-out table is adapted to the speed of the extrusion.

Another object of my invention is to provide an extrusion handling device for metal extrusion presses in which the speed of travel of the extrusion handling member will be automatically regulated in accordance with the speed of the extrusion to exert a uniform pull on the extruded part as it emerges from the die.

Another object of my invention is to provide an extrusion handling device for metal extrusion presses which will be largely automatic in its operation, thereby reducing the use of manpower, and which will exert an even, uniform pull on the extruded material so that the extrusion will be maintained substantially straight.

Another object of the invention is to provide an extrusion handling device particularly for metal extrusion presses in which the extruded parts may be automatically pulled along the run-out table and loaded onto a conveyor or cooling bed.

Various other objects and advantages of my invention will become apparent as this description proceeds.

In the accompanying drawings which show certain preferred forms of embodiment of my invention for purposes of illustration, Fig. 1 is a plan view with parts shown in section of one form of embodiment of my improved extrusion handling device.

Fig. 2 is a side elevation of the extrusion handling device partly in section, taken substantially on the line 2—2 of Fig. 1.

Fig. 3 is an enlarged detail of the gripping head, carriage and driving motor.

Fig. 6 is a plan view of a modified form of embodiment of the extrusion handling device.

Fig. 7 is a side elevation of the extrusion handling device shown in Fig. 6 substantially along the line 7—7 of Fig. 6.

Fig. 8 is a sectional view substantially on the line 8—8 of Fig. 6.

Fig. 9 is an enlarged detail of the extrusion gripping device and carriage illustrated in Fig. 6.

Figure 4:
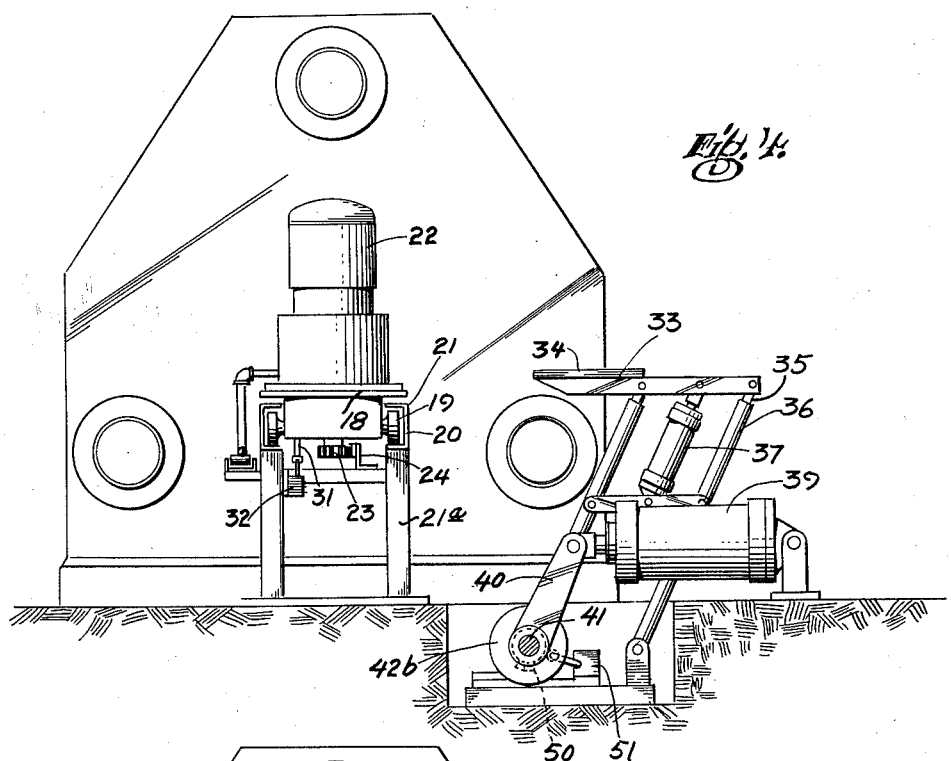
Fig. 4 is a sectional view substantially along the line 4—4 of Fig. 1.

In the form of embodiment of the invention illustrated in Fig. 1, the platen of an extrusion press is indicated at 5, the die through which the extrusion is pushed is indicated at 10, the transverse die slide is indicated at 11, and the graphite guide tubes through which the extruded parts move in their passage from the die to the run-out table or run-out path are indicated at 12. The extruded material, consisting in the illustrated embodiment of two extruded bars, is indicated at 16, and a carriage which pulls the extruded part or parts along the run-out table or run-out path is indicated at 18.

The carriage 18 is preferably provided with a rectangular frame and a plurality of wheels 19 adapted to run in channels 20 provided in a frame or track 21, which forms the run-out path for the extruded parts. The track 21 is mounted on suitable support 21ᵃ. A constant torque motor 22 operating a gear 23 which meshes with a fixed rack 24 secured to unnumbered cross members supported from supports 21ᵃ for the run-out track 21 moves the carriage 18 along the track 21. The carriage 18 is provided with a gripping head 25 which may carry one or more sets of gripping jaws 26 which are adapted to grip one or a plurality of strands of the extruded metal or other material. The constant torque motor 22 will exert a uniform pull on the carriage 18 and gripping head 25 so that the speed of the carriage 18 will automatically adapt itself to the speed of the extrusion. By adjustment of the magnitude of the torque, the extrusion handling means may be adjusted to the handling of extruded parts of different size and strength.

Constant torque motor 22 receives its power through electric cable 27 connected with an automatic winding cable reel 28 which in turn is connected with a suitable source of power for driving the motor 22. An air cylinder or solenoid 29 connected to the gripping head 25 is provided for opening and closing the gripping jaws 26 and a switch or tripping device 30 is provided, with means for controlling the operation of the air cylinder or solenoid 29, to cause the jaws 26 to close on the extruded part or parts when the switching member 30 is contacted by the extruded part. Two or more solenoids 29 and two or more switches 30 may be provided for actuating different gripping jaws 26 where multiple-strand extrusions are to be handled, or limit switches 30 may be so arranged that a single pair of gripping jaws 26 will be closed on a multiple-strand extrusion only after a plurality of limit switches have been actuated.

The carriage 18 is provided on its under side with a cam member 31 adapted to operate a series of limit switches 32 to control the positioning of work-supporting members 33 under the extruded parts as the extrusions are pulled along the run-out track 21. The work-supporting members 33, which function as a run-out table or support for the extruded parts, preferably have graphite supporting plates or trays 34 mounted thereon in position to support the extruded part at various places between the die and the carriage 18 and prevent scratching or marring of the extruded parts. The work-supporting members 33 are preferably pivotally supported on pivoted rods or members 35 slidable in tubular arms or members 36 which are pivoted on suitable supports at their lower end and the relative vertical position or height of the work-supporting members 33 is controlled by an air or hydraulic cylinder 37 and piston 38, whereby the work-supporting members 33 may be raised or lowered as hereinafter described. Links 36ª pivotally connect the tubular arms 36 and provide support for the cylinder 37.

In the embodiment illustrated in Figs. 1 to 5, inclusive, the work-supporting members 33 are moved from a position remote from track 21 into position under the extruded parts by means of an operating cylinder 39 connected by a crank 40 to a shaft 41 extending parallel with the runout track 21 substantially throughout the length of the runout track. The shaft 41 has a plurality of magnetic clutches comprising members 42ª and 42ᵇ, one member of which is fixed on the shaft 41 and the other member loosely mounted thereon, and each magnetic clutch member 42ª—42ᵇ may be individually energized when it is desired to move the work-supporting member 33 controlled by this clutch into position to support an extrusion. All of the clutches 42ª—42ᵇ may be energized when desired so as to move the work-supporting members 33 simultaneously to move the extruded parts from the run-out path onto the conveyor table.

The conveyor table in the embodiment illustrated in Figs. 1 to 5, inclusive, consists of a plurality of conveyor chains 44 driven from a shaft 45 by means of a motor 46, and supported at each end by suitable sprockets, as illustrated.

In the operation of the extrusion handling device illustrated in Figs. 1 to 5, inclusive, the gripping head 25 is advanced to the dotted line position indicated in Fig. 2 adjacent the outlet of the graphite tubes 12 and as the extruded members leave the ends of the graphite tubes 12, the extruded members strike the control switch 30 in the gripping head 25. As described above, one or more control switches 30 may be provided to control all or a plurality of gripping jaws 26 and when the control switch 30 has energized the solenoid 29, the gripping jaws 26 close upon the extruded part or parts to firmly grip the extrusion.

Movement of the carriage 18 will be started automatically by energization of the constant torque motor 22, controlled from switch means 30, so that a constant pull will be exerted upon the extruded part or parts as they emerge from the die 10 regardless of the speed of the extrusion. The magnitude of the pull may be adjusted in accordance with the size and shape of the parts being extruded by adjusting the torque of the motor 22.

Figure 5:
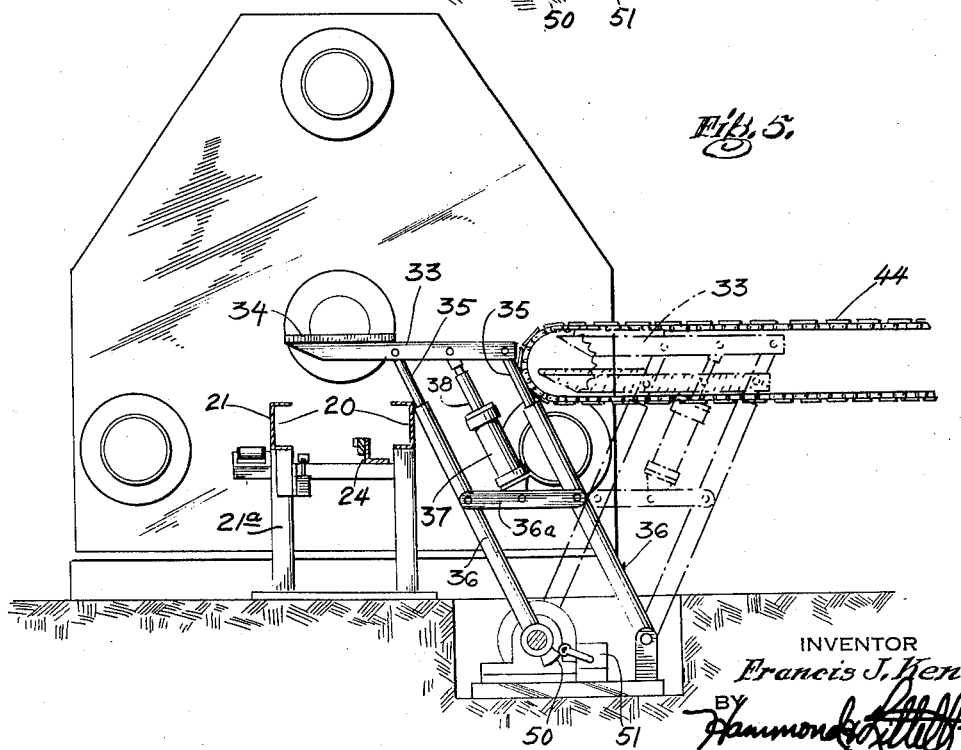
Fig. 5 is a sectional view substantially along the line 5—5 of Fig. 1.

Prior to the start of the extrusion operation all of the work-supporting members 33 will have been moved to the position indicated in Fig. 4, which corresponds to the dotted line position of Fig. 5. As the carriage 18 is moved along the channels 20 in the track 21, the cam 31 on the under side of the carriage 18 will contact switches 32 located opposite but somewhat to the rear of the supporting members 33. As each limit switch 32 is contacted by the cam 31 on the carriage 18, the supporting members 33 will be moved sequentially into position under the extruded part.

This is accomplished by connecting each switch 32 so that it will actuate the common operating cylinder 39 for the shaft 41 as well as the magnetic clutch 42ª—42ᵇ which is associated with the supporting member 33 to be moved into position under the extruded shape. For example, when the carriage 18 has passed the first supporting member 33, the cam 31 will trip the first switch 32, which will cause the piston of cylinder 39 to be moved forward to impart a partial rotation to shaft 41. The magnetic clutch 42ª—42ᵇ controlling the first supporting member 33 will be simultaneously energized to move the pivoted members 35 and 36 carrying the supporting member 33 forward.

When the supporting member 33 has reached its forward position under the extruded part or parts 16, a cam member 50 on the hub of one of the tubular members 36 will actuate a limit switch 51 connected to the clutch member 42ª—42ᵇ to de-energize the clutch 42ª—42ᵇ associated with the first supporting member 33, and to energize cylinder 39 to return the piston of this cylinder to its starting position, as illustrated in Fig. 4. This sequence of operation is repeated each time the carriage 18 actuates one of the limit switches 32. The height of the work-supporting members 33 is controlled by the air or hydraulic cylinders 37 and pistons 38 so that the height of the extrusion-supporting members 33 may be adjusted as desired to give proper support to the extruded part or parts. Preferably, the stroke of the piston 38 is set to the correct height for the particular extrusion being handled, and after one of the work-supporting members 33 is moved into position under the extrusion, the corresponding cylinder 37 is automatically actuated by limit switch 51 to raise the supporting member 33 to the correct height.

In Fig. 1, the first and second supporting members 33 are shown in supporting position under the extrusion and the remaining supporting members are shown in their retracted position.

As the carriage 18 moves along the track 21 eventually all of the extrusion-supporting members 33 will be moved into position to give support to the extruded parts at spaced intervals along the run-out track. The length of travel of the carriage 18 will depend upon the length of the extrusion and the carriage may be stopped manually or selectively by one of the limit switches 32 or by a separate limit switch, the position of which may be adjusted along the track 21. Alternatively the carriage may be stopped by a limit switch located on the extrusion press itself and tripped when the ram of the press has completed its extrusion stroke.

After the extruded material has been severed from the discard remaining in the billet container, the carriage 18 may be moved an additional distance along track 21 by suitably actuating motor 22 to withdraw the extruded material from the guides or tubes 12. The jaws 26 will then be opened and the carriage 18 again moved away from the press a sufficient distance so that the extruded material will pull out of gripping head 25 and rest only on the supporting members 33. When the extruded parts are in this position the piston of the cylinder 39 will be moved to its forward position, all of the clutches 42ª—42ᵇ will be energized, and the piston of the cylinder 39 actuated to carry out a return stroke to swing the arms 36 and the supporting members 33 into their rearward or unloading position adjacent to the chain conveyors 44.

The parts are preferably arranged so that during their rocking motion the supports 33 will deposit the extruded parts on the conveyor chains 44. For this purpose the tubular members 36 and rods 35 are preferably rocked beyond the point at which the graphite plates or trays 34 are at the same level as the conveyor chains 44. Supporting arms 33 may then be lowered by means of cylinders 37 and pistons 38 after completion of their rocking motion or at the beginning of the next extrusion cycle. In their lowered position the supporting arms 33 will pass under the extruded parts when they are subsequently moved forward during the next extrusion operation, and when they are in position under the extruded part they may be raised to the desired height by operation of the cylinders 37.

The chains 44 will carry the extruded material toward the right in Figs. 4 and 5 and are preferably moved in steps so as to serve as a cooling bed with the extruded parts resting thereon. The speed and cycle of movement of the conveyors 44 are adjustable in accordance with the requirements of the individual extrusion operations to provide the desired cooling period for the extruded shapes.

Before the next extrusion operation, carriage 18 is returned to its initial position adjacent the platen, preferably at fast speed.

In the modified form of embodiment of my invention illustrated in Figs. 6 to 9, inclusive, the platen 5 has a die mounted therein as illustrated in Figs. 1 and 2 and graphite tubes 12 through which the extruded parts move from the die to the run-out table. The platen 5 and its enclosed accessories is essentially identical to the construction illustrated in connection with Figs. 1-5, inclusive. The carriage 18 with its associated gripping head 25 is mounted on wheels 19 running in channels 20 in the track 21, and a constant torque motor 55 located at the end of the track 21 drives a chain or cable 56 moving around sprockets or pulleys 57 and connected at each end to the carriage 18 to move the carriage 18 back and forth along the track 21, the return movement being preferably performed at fast speed.

A magnetic brake 58 receiving energy through cable 59 is mounted on the carriage 18 and serves to hold the carriage in its forward position close to the press while the motor 55 is started to take up any slack in the chain 56 and impart tension thereto. Release of brake 58 may be effected by limit switch 30 mounted in the gripping head 25 of the carriage 18 to start rearward travel of the carriage 18 and close the gripping jaws 26 upon the extruded parts emerging from the graphite tubes 12.

A series of limit switches 32 located along the underneath side of track 21 actuate movement of the supporting members 33 to bring the graphite supporting plates or trays 34 into position under the extruded parts as the carriage 18 moves along the run-out track in a manner similar to that illustrated in Fig. 1. Movement of the carriage 18 may be stopped at any desired point by de-energizing the motor 55 and energizing the magnetic brake 58 simultaneously to prevent the carriage from being advanced through an additional distance due to the tension of the chain 56 or the inertia of the carriage 18.

In Fig. 6 the shaft 41 carrying the magnetic clutch members 42ª—42ᵇ is illustrated as being rotated by a motor 60, preferably of the reversible type, and belt 61 in place of the cylinder 39 to impart rotation to shaft 41. The motor 60 will be energized as desired to rotate the shaft 41 to move the work-supporting arms 33 forward or back as described in connection with the embodiment of Figs. 1 to 5. Otherwise the movement of the extrusion-supporting members 33 into and out of position is essentially similar to that previously described. In the operation of the embodiment of the invention illustrated in Figs. 6 to 9, inclusive, the extruded parts may be moved from the run-out table onto conveyors in a manner similar to that described in connection with Figs. 1 to 5, inclusive.

Certain parts, such as electrical wiring and piping to the various operating means, have been omitted from the drawings for the purpose of simplifying the illustration of my invention, as the installation and operation of these omitted parts will be obvious to persons skilled in the art.

It will be understood that various modifications and changes may be made from the embodiments of the invention herein described. For example, the constant torque motor 55 may be replaced by a constant torque hydraulic drive or coupling; further, the chain or cable 56 may be caused to rotate constantly and the carriage 18 may be connected thereto or disconnected therefrom by a magnetic gripping clutch. Various other modifications and changes will occur to persons skilled in the art and are understood to be within the scope of the following claims.

I claim:

1. In an extrusion handling device, a die through which an extruded part is extruded, a frame adjacent said die providing a run out track along which the extrusion is extruded, a carriage movable along said track, supports on said track to support said carriage, a constant torque motor to impart a pull of constant force to said carriage, a gripping head on said carriage to grip an extruded part extruded from an extrusion press and pull it along said track, a plurality of gripping jaws on said gripping head, power means for actuating said gripping jaws, a contact member in said gripping head actuated by an extruded part when the extruded part has been extruded a given distance into said gripping head, means controlling the actuation of said power means, and means operated by said actuation to close said gripping jaws on the extruded part.

2. In an extrusion handling device, a die through which an extruded part is extruded, a frame adjacent said die providing a run out track along which the extrusion is extruded, a carriage movable along said track, supports on said track to support said carriage, a constant torque motor to impart a pull of constant force to said carriage, a gripping head on said carriage to grip an extruded part extruded from an extrusion press and pull it along said track, a plurality of gripping jaws on said gripping head, power means for actuating said gripping jaws, a contact member in said gripping head actuated by an extruded part when the extruded part has been extruded a given distance into said gripping head, means controlling the actuation of said power means, means operated by said actuation to close said gripping jaws on the extruded part and a switch in said contact member to automatically energize said constant torque motor to pull said carriage along said track when said gripping jaws have been closed upon an extruded part.

3. In a metal extrusion handling device, a die through which an extrusion is extruded, a track adjacent said die, a carriage movable along said track, supports on said track to support said carriage, a constant torque motor to impart a pull of constant force to said carriage, gripping jaws on said carriage to grip an extruded part extruded through said die and pull it along said track when said carriage is moved away from said die, a plurality of extrusion supporting members along said track mounted on movable supporting arms pivoted on axes extending longitudinally of said track, a motor and shaft to move said extrusion supporting members about said axes in an orbital path at right angles to said track, a cam on said carriage, a plurality of switches along said track actuated by said cam each associated with a corresponding supporting member, means actuated by each switch to cause said latter motor to actuate the supporting member associated with said switch to move said supporting member to a position under the extruded part as the carriage moves along said track past said extrusion supporting members and a cylinder and piston for each extrusion supporting member to raise the extrusion supporting member relative to said arms to the level of the extrusion.

4. The construction of claim 3 wherein the means actuated by each switch includes a clutch.

References Cited in the file of this patent

UNITED STATES PATENTS

| | | |
|---|---|---|
| 342,918 | Loggie | June 1, 1886 |
| 504,394 | Maddock | Sept. 5, 1893 |
| 685,465 | Boyd | Oct. 29, 1901 |
| 1,683,973 | Heichert | Sept. 11, 1928 |
| 2,182,902 | Nye et al. | Dec. 12, 1939 |
| 2,370,481 | Morgan | Feb. 27, 1945 |
| 2,379,622 | Butler | July 3, 1945 |
| 2,404,234 | Kerr | July 16, 1946 |
| 2,446,438 | Strock | Aug. 3, 1948 |
| 2,720,310 | Yack et al. | Oct. 11, 1955 |

FOREIGN PATENTS

| | | |
|---|---|---|
| 284,085 | Great Britain | Jan. 26, 1928 |
| 559,450 | Great Britain | Feb. 21, 1944 |